(12) United States Patent
Yahagi (10) Patent No.: US 7,580,669 B2
(45) Date of Patent: *Aug. 25, 2009

(54) CONTENT DISTRIBUTION SYSTEM, METHOD FOR DISTRIBUTING CONTENT AND COMPUTER PROGRAM THEREOF

(75) Inventor: Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/837,992

(22) Filed: Aug. 13, 2007

(65) Prior Publication Data

US 2007/0293145 A1     Dec. 20, 2007

Related U.S. Application Data

(63) Continuation of application No. 10/462,671, filed on Jun. 17, 2003, now Pat. No. 7,257,368.

(30) Foreign Application Priority Data

Jun. 26, 2002     (JP)     ............................. 2002-185419

(51) Int. Cl.
     H04H 1/00     (2006.01)
(52) U.S. Cl. .................. 455/3.01; 455/414.3; 455/517; 455/552.1
(58) Field of Classification Search ............ 455/8, 455/3.01–3.03, 9, 3.02, 3.06, 412.2, 414.3, 455/419, 427, 12.1, 510, 507, 509, 450, 517, 455/552.1, 3.05, 69, 67.11; 725/116; 705/59, 705/4

See application file for complete search history.

(56) References Cited

U.S. PATENT DOCUMENTS

| 5,222,061 | A | * | 6/1993 | Doshi et al. ................. 370/394 |
|---|---|---|---|---|
| 6,772,209 | B1 | * | 8/2004 | Chernock et al. ........... 709/225 |
| 2001/0055356 | A1 | | 12/2001 | Davies |
| 2002/0026644 | A1 | * | 2/2002 | Hatayama .................... 725/116 |
| 2002/0133491 | A1 | * | 9/2002 | Sim et al. ..................... 707/10 |
| 2003/0167392 | A1 | * | 9/2003 | Fransdonk .................. 713/156 |
| 2004/0030990 | A1 | * | 2/2004 | Kobayashi et al. ........ 715/500.1 |
| 2004/0103011 | A1 | * | 5/2004 | Hatano et al. .................. 705/4 |

FOREIGN PATENT DOCUMENTS

| EP | 0 741 468 | 11/1996 |
|---|---|---|
| JP | 10-243372 | 9/1998 |
| JP | 10-285161 | 10/1998 |
| JP | 11-331070 A | 11/1999 |

(Continued)

OTHER PUBLICATIONS

Chinese Office Action issued in corresponding Chinese Patent Application No. 200610082687.3.

*Primary Examiner*—John J Lee
(74) *Attorney, Agent, or Firm*—Sughrue Mion, PLLC (57) ABSTRACT

In a content distribution system, when distributing content to a plurality of user equipment, a multicasting channel is assigned between the user equipment and the distribution system, content being multicasted using this multicasting channel. If a user equipment fails to receive distributed content, the radio network controller allocates an individual channel between the user equipment and the distribution system to perform re-distribution of the content in response to the user's request.

9 Claims, 8 Drawing Sheets

FOREIGN PATENT DOCUMENTS

| | | |
|---|---|---|
| JP | 2000-270015 A | 9/2000 |
| JP | 2002-51006 A | 2/2002 |
| JP | 2002-78020 A | 3/2002 |
| JP | 2002-95065 A | 3/2002 |
| WO | WO 01/78324 A1 | 10/2001 |

* cited by examiner

CONTENT DISTRIBUTION SYSTEM, METHOD FOR DISTRIBUTING CONTENT AND COMPUTER PROGRAM THEREOF

BACKGROUND OF THE INVENTION

1. Field of the Invention

The present invention relates to a content distribution system, a method for distributing content and a program thereof, and more particularly it relates to a content distribution system, a method for distributing content for performing a simultaneous distribution of same multimedia content to a plurality of mobile communication terminals, that is, performing one-to-many distribution (herein referred to as "multicasting") of content.

2. Related Art

In the past, in the case of distributing of content such as characters, music, images, or computer programs and the like to users terminals (mobile communication terminals such as cellular telephones), multicasting of the content was performed using a multicasting channel.

In a system for multicasting content using a multicasting channel, it is in principle possible to use one and the same wireless resource to distribute the same content to all user terminals existing within the area reached by the signal on the channel, and in this system, it is possible to provide a high efficiency with respect to wireless resources, compared with the case of a system in which each individual wireless resource is distributed to each user terminal individually.

However, the area reached by the wireless signal has a service area that is limited by the wireless environment, which changes in accordance with, for example, the shape of the coverage area, the existence or absence of structures, or temporary movement of radio wave blocking objects. In such a situation, it is difficult to guarantee continuous and/or stabled distribution of content to all users. Given this, it is possible to envision, for the purpose of performing content distribution more reliably, an increase in the transmitter output power at a base station, or the allocation of different wireless channels for each user terminal.

In the case in which the transmission power is increased, however, because of an increase in interference power relative to other users in the same or a neighboring area, there results a decrease in the number of user terminals that can be accommodated. In the case of allocating different wireless channels for each user terminal, because as many wireless channels are required as there are user terminals, there is a drop in the efficiency of usage of wireless resources, compared with the above-noted system using a multicasting channel.

In order to more reliably distribute content, it is possible to envision a system in which a user terminal that was not able to receive content requests the network to resend the content via a multicasting channel. In this case, however, the distribution of new content to user terminals that received normally is hindered, this being undesirable from the standpoint of maintaining the real-time distribution of the content.

With respect to content to be distributed to the users, there is content that is charged a fee and content that is provided for a fee, and in the case of free content even if reception was temporarily or for a long time not possible no problem would occur regarding a contractual relationship, but for paid content if it is not possible to fulfill the contractual condition of distributing content, a contractual problem would occur. Therefore, particularly in the case of paid-for content, it is important to resend content in the case in which a user terminal fails to receive the content.

However, the sending of not only yet-to-be distributed content but already-distributed content in response to a request from a user terminal occupies a wireless channel for a prescribed time, thereby resulting in decreasing of the number of user terminals that can be accommodated, it is desirable that re-distributing be done selectively, to only user terminals which requests such re-distributing.

Additionally, the re-distributing of content should only be done to user terminals properly registered for the distribution of the content, and it is desirable that even should there be a request from an improper user terminal not registered for distribution, there is no re-distributing to the improper user terminal.

Accordingly, it is an object of the present invention to provide content distribution system, a method for distributing content, a radio network controller, and a program, which can achieve highly reliable content distribution with effective usage of wireless resources.

SUMMARY OF THE INVENTION

In order to achieve the above-noted object, the present invention has the following basic technical distribution.

The first aspect of the present invention is a content distribution system for performing multicasting of one and the same content from a mobile communication network system to a plurality of mobile communication terminals, the network system having a re-distributing means which resends the content to each mobile communication terminal that failed in receiving the multicasted content.

The second aspect of the present invention is the content distribution system according to claim 1, wherein each of the plurality of mobile communication terminals having a re-distribution requesting means for requesting the network system to resend the content in a case in which the mobile communication terminal fails in receiving the multicasted content, wherein the re-distributing means of the network system, in response to a re-distributing request from the re-distribution requesting means, resends the content which the mobile communication terminal requests.

The third aspect of the present invention is that the content is multicasted from the network system after properness of each of the plurality of mobile communication terminals is ascertained, the re-distributing requesting means of the mobile communication terminal, when requesting re-distributing of the content to the network system, sending to the network system information required to verify properness of the mobile communication terminal, and the re-distributing means of the network system judging, based on the information received from the mobile communication terminal, whether or not to execute re-distribution to the mobile communication terminal.

DETAILED DESCRIPTION OF THE PREFERRED EMBODIMENTS

Embodiments of the present invention are described below in detail, with references made to relevant accompanying drawings.

First Embodiment

Figure 1:
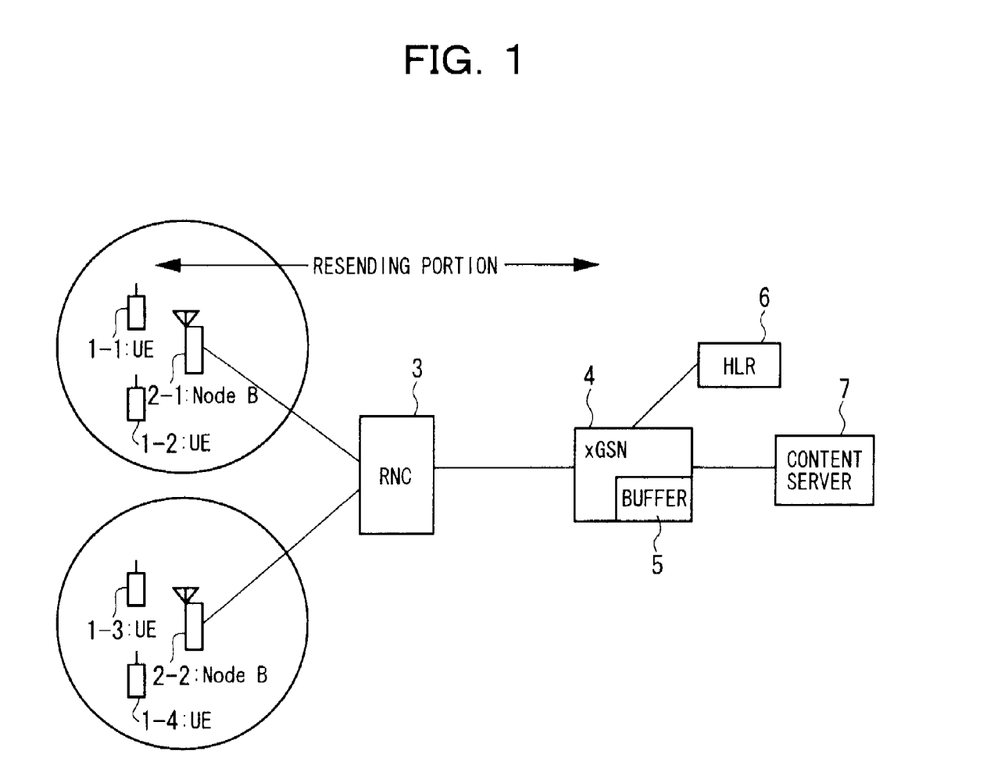
FIG. 1 is a drawing showing the configuration of a content distribution system according to a first embodiment of the present invention.

FIG. 1 shows the configuration of a content distribution system according to the first embodiment of the present invention. The content distribution system of the first embodiment shown in FIG. 1 is formed by UEs (user equipment) 1-1 to 1-4, which are mobile apparatuses (mobile communication terminals), the node B 2-1 and the node B 2-2, which are base stations, a radio network controller (RNC) 3, which is a base station controller, an xGSN (SGSN: Serving GPRS (General Packet Radio Service) Support Node or GGSN (Gateway GPRS Support Node) 4, an HLR (Home Location Register) 6, and a content server 7.

The xGSN 4 and HLR 6 form a mobile communication network CN (core network), and the node B 2-1 and the node 2-2 and RNC 3 form a mobile communication network RAN (radio access network).

The node B 2-1 perform radio communication between the UEs 1-1 and 1-2 existing within a cell of the node B 2-1, and the node B 2-2 performs radio communication between the UEs 1-3 and 1-4 existing within a cell of the node B 2-2. The RNC 3 housing the node B 2-1 and the node 2-2 has a function that relays a signal sent and received by the UEs 1-1 to 1-4, and a function of allocating a radio channel for transmitting a radio signal used between each node B and each UE.

The xGSN 4, which has a packet switching function, is provided with a re-distribution buffer 5 for storing content for the purpose of re-distribution thereof. The HLR 6 is a database that assures the mobility of a mobile terminal, and manages various information (such as routing to a mobile terminal and service contract information) required to provide service. The content server 7 holds various content, and multicasts this content to each targeted UE.

Figure 2:
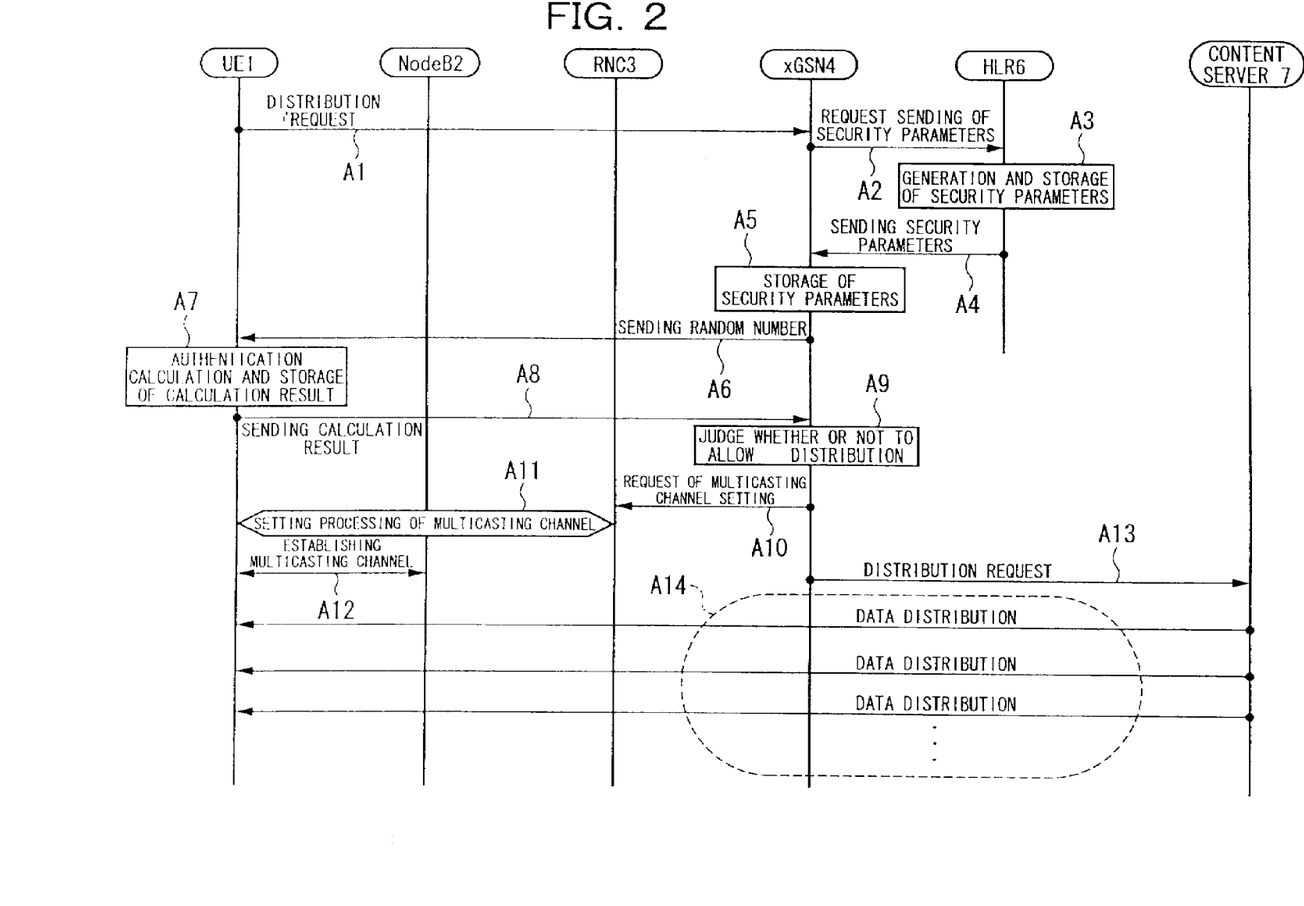
FIG. 2 is a sequence chart showing an example of content multicasting operation in each of the content distribution systems shown in FIG. 1 and FIG. 6.

FIG. 2 is a sequence chart showing an example of the content multicasting operation in the content distribution system of FIG. 1. In FIG. 1 and FIG. 2, in the case in which UE 1-1 requests content distribution, a content distribution request issued from the UE 1-1 is received via the node B 2-1 and the RNC 3 by the xGSN 4 (step A1).

The xGSN 4, in response to the distribution request form the UE 1-1, performs a security parameter send request to the HLR 6 for the purpose of verifying the properness of the UE 101 (step A2). The HLR 6, in response to the security parameter send request from the xGSN 4, generates and stores a security parameter (step A3). That is, the HLR 6 first generates a random number, and then performs a authentication calculation based on this random number. The HLR 6 has stored into beforehand a key or algorithm for the purpose of making the authentication calculation.

The HLR 6 sends the random number and authentication calculation result as a response to the security parameter send request to the xGSN 4 (step A4). The xGSN 4, in addition to storing these items (step A5), sends the random number via the RNC 3 and the node B 2-1 and the node 2-2 to the UE 1-1 (step A6). The UE 1-1 performs an authentication calculation based on the random number from the xGSN 4 and stores calculation result (step A7). Each of the UEs 1-1 to 1-4, similar to the HLR 6, holds a key or algorithm related to the authentication calculation.

The UE 1-1 sends the calculation result via the node B 2-1 and the RNC 3 to the xGSN 4 (step A8). The xGSN 4, by comparing the calculation result from the UE 1-1 with the calculation result stored at step A5, makes a judgments as to whether or not content is to be distributed to the UE 1-1 (step A9). That is, if the results of these two calculations coincide, because UE 1-1 is a properly authenticated terminal, processing proceeds to steps A10 through A14 so as to perform distribution to the UE 1-1. However, if these two calculation results do not coincide, because the UE 1-1 is improper, distribution to the UE 1-1 is not done.

In the case in which the UEs 1-2 through 1-4 make a distribution request, the authentication processing from step A1 to step A9 is performed. For example, a case can be envisioned in which the UEs 1-2 to 1-4 also make a request for content distribution, substantially simultaneously with the content distribution request from the UE 1-1, and the processing of steps A1 to A9 is done to make a judgment as to whether or not each of the UEs 1-1 to 1-4 are proper terminals, whereupon content is distributed to the UEs 1-1 to 1-4.

In the above-noted case, the xGSN 4 makes a multicasting channel setting request to the RNC 3 for the purpose of multicasting content (step A10). The RNC 3, in response to the multicasting channel setting request from the xGSN 4, performs multicasting channel setting processing so as to allocate a multicasting channel to the UEs 1-1 and 1-2 existing within the cell of the node B 2-1, and so as to allocate a multicasting channel to the UEs 1-3 and 1-4 existing within the cell of the node B 2-2 (step A11). By this multicasting channel setting processing, a multicasting channel is established between the node B 2-1 and the UEs 1-1 and 1-2, and a multicasting channel is established between the node B 2-2 and the UEs 1-3 and 1-4. The cell information is stored in each UEs, respectively. (step A12).

The xGSN 4 makes a request to the content server 7 to start the distribution of content requested by the UEs 1-1 to 1-4 (step A13). The content server 7, in response to the distribution request from the xGSN 4, sequentially sends the data segments making up the content, so as to distribute the content (step A14). Each of the segments sequentially sent by the content server 7 is received by the node B 2-1 and the node 2-2 via the xGSN 4 and the RNC 3, the node B 2-1 using multicasting channel to send the received segments to the UEs 1-1 and 1-2, and the node B 2-2 using the multicasting channel to send the received segments to the UEs 1-3 and 1-4. In this manner, the content is multicasted to the UEs 1-1 to 1-4.

In the content distribution system according to the first embodiment of the present invention, because the xGSN 4 uses a buffer 5 to perform re-distributing, a segment that is sent by the content server 7 and received at the xGSN 4 at step A14 is written into the buffer 5 for the purpose of re-distributing and also sent to the RNC 3.

Each of the segments sequentially sent by the content server 7 has a content ID, which is identification information for the content, a segment group number indicating to what number segment group of the content the segment belongs, and a segment number indicating what number segment the segment is in the segment group. For example, if content is made up of 6 segments and one segment group has 3 segments, the segment group number G#1 will be appended to the $1^{st}$ to $3^{rd}$ segments, and the segment group number G#2 will be appended to the $4^{th}$ to $6^{th}$ segments. Additionally, the segment number Seg#1 will be appended to the $1^{st}$ segment, the segment number Seg#2 will be appended to the $2^{nd}$ segment, the segment number S#3 will be appended to the $3^{rd}$ segment, the segment number S#1 will be appended to the $4^{th}$ segment, the segment number S#2 will be appended to the $5^{th}$ segment, and the segment number S#3 will be appended to the $6^{th}$ segment.

It is, of course, possible to eliminate the use of segment group numbers, in which case each of the segments sequentially sent by the content server 7 has appended to it a content ID, which is content identification information, and a segment number, which indicates what segment of the content it is. For example, if the content is made up of 6 segments, the segment number S#1 is appended to the $1^{st}$ segment, the segment number S#2 is appended to the $2^{nd}$ segment, the segment number S#3 is appended to the $3^{rd}$ segment, the segment number S#4 is appended to the $4^{th}$ segment, the segment number S#5 is appended to the $5^{th}$ segment, and the segment number S#6 is appended to the $6^{th}$ segment.

Each of the UEs 1-1 to 1-4, based on the information (content IDs, segment group numbers, and segment numbers) appended to the received segments multicasted at step A14 of FIG. 2, recognizes segments of the content that were not received normally (that is, for which receiving failed). A UE having detected a failed received segment requests the network to re-distribute the failed received segment.

Figure 3:
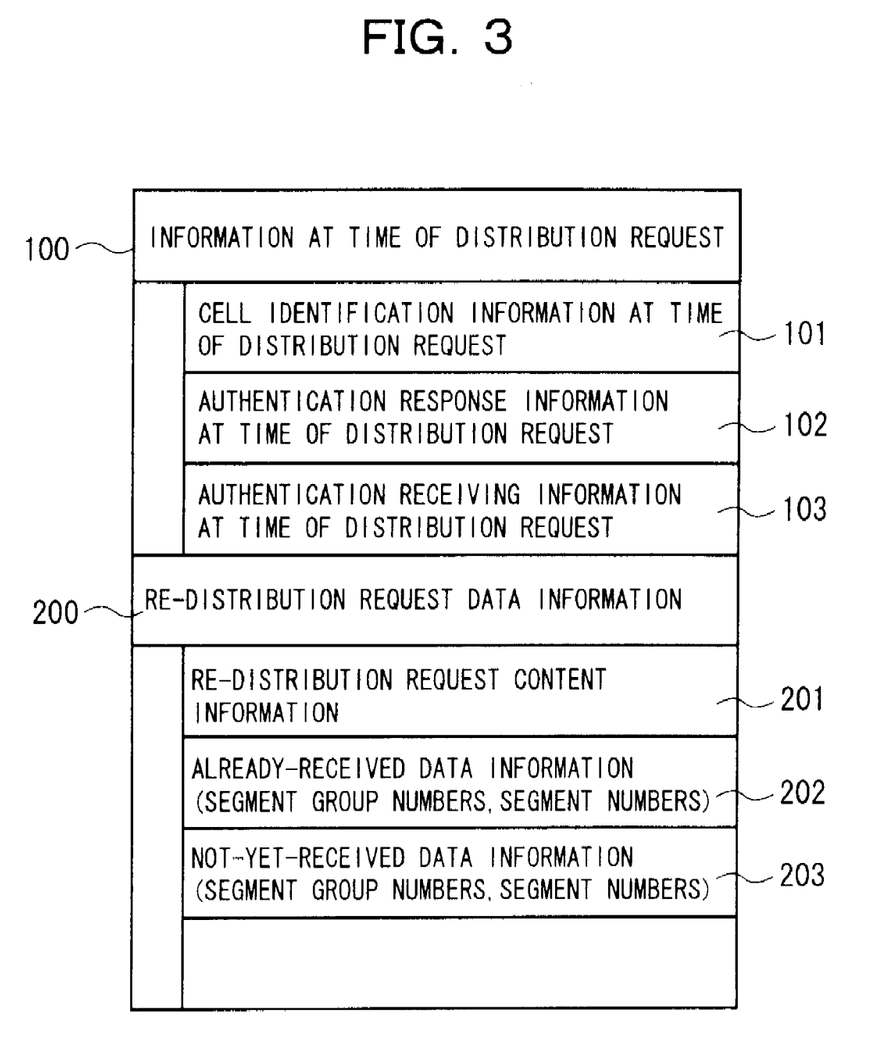
FIG. 3 is a drawing showing information parameters to be sent when a user equipment (UE) requests a network to resend.

FIG. 3 is a drawing showing the information parameters sent when a request from the UE is made to the network to re-distribute. As shown in FIG. 3, the information sent by the UE in order to make the re-distribution request includes information proving that the UE is a proper terminal (information at the time of the distribution request 100) and information indicating the segment that needs to be re-distributed (re-distribution requested data information 200).

Information at the time of the distribution request 100 include cell identification information at the time of the distribution request 101, authentication response information at the time of the distribution request 102, and authentication received information at the time of the distribution request 103. When a re-distribution request is made, at least one of these information types is sent to the network. The cell identification information at the time of the distribution request 101 is information indicating the cell in which the UE existed at the time of the distribution request (step A1 in FIG. 2). In the case in which the node B has a plurality of directional antennas and the node B has a plurality of sectors, each of the associated sectors is called a cell. The authentication response information at the time of the distribution request 102 is information that is returned by the UE for user authentication at the time of making the distribution request, this being an authentication calculation result (step A8 in FIG. 2). The authentication received information at the time of the distribution request 103 is information received by the UE from the network for the purpose of user authentication at the time of the distribution request, this being a random number (step A6 in FIG. 2). Because these types of information are difficult for an UE other than the requesting UE to know, by using at least one of these types of information, it is possible to prevent an UE from posing as this UE and making a request for re-distribution in an attempt to receive the content improperly.

As re-distribution requested data information 200, there is re-distribution request content information 201, already-received data information 202, and not-yet-received data information 203. The re-distribution request content information 201 is a content ID indicating the content of a segment for which receiving failed. The already-received data information 202 is the segment number and segment group number of a successfully received segment that was received normally. The not-yet-received data information 203 is the segment number and the segment group number of a segment for which receiving failed. By using these types of information, it is possible for the network that receives the re-distribution request from an UE to recognize what segment needs to be re-distributed to that UE.

When making a re-distribution request, the UE sends to the network as re-distribution request data information the re-distribution requested content information 201 and at least one of the already-received data information 202 and the not-yet-received data information 203. This is because, based on the re-distribution requested content information and at least one of the already-received data information and the not-yet-received data information, it is possible for the network to recognize what segment is to be re-distributed to the UE. If the number of segments of the multicasted content for which receiving succeeded is smaller than the number of segments for which received failed, it can be envisioned that the already-received data information, which is a smaller amount, is sent.

Figure 4:
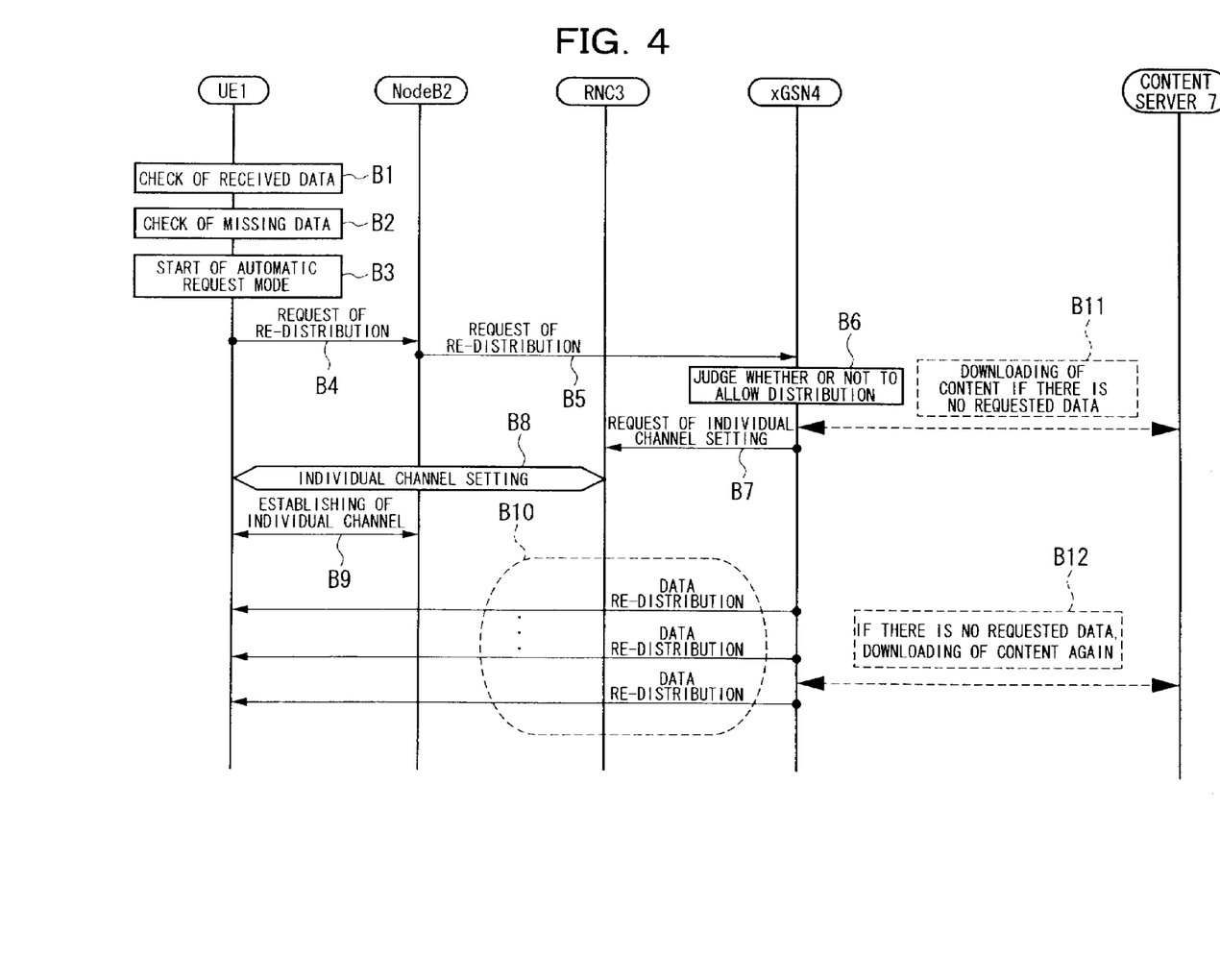
FIG. 4 is a sequence chart showing an example of content re-distribution in the content distribution system of FIG. 1.

FIG. 4 is a sequence chart showing an example of content re-distribution operation in the content distribution system shown in FIG. 1. The following description focuses on the UE 1-1 in presenting the operation that occurs when performing re-distribution. In FIG. 1 and FIG. 4, when the UE 1-1 receives a segment via a multicasting channel from the node B 2-1, the received segment is checked (step B1), and verification is done of missing data, this being a segment for which receiving failed (step B2), based on the information appended to the received segment (content ID, segment group number, and segment number).

The UE 1-1 then transitions to the automatic request mode (step B3), and requests re-distribution to the network (steps B4 and B5). Transition can alternatively be made to the automatic request mode when the UE 1-1 recognizes that it has failed to receive a segment a prescribed number of times, when a prescribed amount of time has elapsed after the start of content multicasting, or after the completion of content multicasting.

At step B3, the UE 1-1 which has transitioned to the automatic request mode, in order to request re-distribution of the segment detected for which failed reception was detected at step B2, sends the information at the time of distribution request 100 and re-distribution request data information 200 (refer to FIG. 3) to the xGSN 4 via the node B 2-1 and RNC 3 (steps B4 and B5).

The xGSN 4, in response to the re-distribution request from the UE 1-1, makes a judgment whether or not to re-distribute to the UE 1-1, based on the information at the time of distribution request 100 (step B6). If the information at the time of the distribution request 100 sent by the UE 1-1 is the authentication response information at the time of the distribution request (calculation result stored by the UE 1-1 at step A7) 102, the xGSN 4 compares this with the calculation result (data stored by the xGSN 4 at step A5 in FIG. 2) of the user authentication made for the purpose of authenticating made by the network. In the case in which the UE 1-1 moves, so that the re-distribution request is made from the UE 1-1 to a different xGSN, the different xGSN 4 obtains the calculation result from the xGSN 4 or the HLR 6, and makes the comparison therewith.

As shown in FIG. 3, the authentication received information at the time of the distribution request 103 can be used as the information at the time of the distribution request 100. In this case, the UE 1-1 stores the random number received from the xGSN 4 at step A7 of FIG. 2 and sends this to the xGSN 4 at step B4. The xGSN 4 makes a comparison between this and the random number (stored by the xGSN 4 at step A5 in FIG. 2) generated by the system for the purpose of authenticating the UE 1-1.

As shown in FIG. 3, it is possible to use cell identification information at the time of the distribution request 101 as the information at the time of the distribution request 100. In this case, at step A1 of FIG. 2 the UE 1-1 sends information indicating the node B 2-1 cell to the xGSN 4 and stores this information as well, and the xGSN 4 stores the received information, the UE 1-1 sending this information at step B4. The xGSN 4 makes a comparison of this with the information that it stored.

By using this type of information at the time of the distribution request 100, it is possible to verify the properness of the UE making the request for re-distribution without the processing performed in steps A2 to A8 of FIG. 2, thereby enabling a simplification of the processing for user authentication for the purpose of re-distribution.

At step B6, when the xGSN 4 decides that re-distribution is to be done to the UE 1-1, that is, when the UE 1-1 is recognized as a proper terminal, a request is made by the xGSN 4 to the RNC 3 for the setting of an individual channel (step B7) so as to allocate an individual channel to the UE 1-1. The RNC 3, in response to the individual channel setting request from the xGSN 4, performs individual channel setting processing so as to allocate an individual channel to the UE 1-1 existing in the cell of the node B 2-1 (step B8). By this individual channel setting processing, an individual channel is established between the node B 2-1 and the UE 1-1 (step B9).

The xGSN 4 performs re-distribution by sequentially reading from the re-distribution buffer 5 the segments (requested segments) to be re-distributed to the UE 1-1, based on re-distribution request data information from the UE 1-1, and sending these segments (step B10). Each of the segments sequentially sent from the xGSN 4 is received at the node B 2-1 via the RNC 3, the node B 2-1 then sending the received segments to the UE 1-1 using the individual channel. In this manner, only segments which the UE 1-1 failed to receive are re-distributed from the xGSN 4 to the UE 1-1.

At the re-distribution performed at step B10, although it is possible to individually send each of the requested segments, it is alternatively possible to send the requested segments with other segments (segments for which reception by the UE 1-1 was successful) interspersed therebetween, as a single batch of data. This is because there are cases in which sending the segments between the requested segments results in a smaller total amount of data than in singularly sending the requested segments. For example, if the segment numbers of requested segments are #1, #3, #5, and #7, in the case in which these requested segments are to be sent individually, it is necessary each time to also append header information indicating the destination address. In contrast, if the segment numbers #2, #4, and #6 are added to requested segments, so that all segments from #1 to #7 are sent as a single data, it is only necessary to have a single header information.

When starting re-distribution to the UE 1-1, if a requested segment is not in the buffer 5, the xGSN 4 downloads the requested segment from the content server 7 before re-distributing the segment to the UE 1-1 (step B11). Furthermore, the requested segment is not existing in the buffer 5 during the process of re-distributing to the UE 1-1, the xGSN 4 downloads the requested segment from the content server 7 (step B12).

As described above, during re-distribution of content, that is, during the time at which multicasting channel is set, there are cases in which the UE 1-1 transitions into the automatic request mode, in which case the individual channel of step B9 is set, without releasing the currently set multicasting channel. By doing this, it is possible to perform re-distribution to the UE 1-1 and multicasting to each of the UEs in parallel.

It is desirable that the data transmission rate of the individual channel be greater than the data transmission rate of the multicasting channel. This is because, when performing re-distribution, if the data transmission rate of the individual channel is slower than the data transmission rate of the multicasting channel it is impossible for the data being re-distributed using the individual channel to keep up with the data being multicasted using the multicasting channel.

Additionally, after verification of the properness of the UE 1-1 at step B6, the xGSN 4, based on the number of segments which the UE 1-1 failed to receive and the number of segments the UE 1-1 succeeded in receiving (determinable from the re-distribution request data information from the UE 1-1), decides whether or not to send the not-yet-sent segments of the content to the UE 1-1 using an individual channel. That is, in the case in which the value of (number of failed segments)/(number of successfully received segments) is above a prescribed threshold value, it is judged that the radio receiving conditions at the UE 1-1 are poor, in which case the xGSN 4, after completion of the re-distribution of step B10, uses the already set individual channel to sent unsent data to the UE 1-1. Because the transmitting power on the individual channel established between the node B 2-1 and the UE 1-1 is controlled by the node B 2-1, it is possible to reduce the probability that the UE 1-1 fails in receiving data.

In the case in which the UE 1-1 requests re-distribution after completion of the multicasting of content, if the value of (number of failed segments)/(number of successfully received segments) is above a prescribed threshold value, after completion of the re-distribution of step B10, the xGSN 4 can distribute to the UE 1-1 different content that was ready for multicasting to the UE 1-1 by using the already set individual channel.

Figure 5:
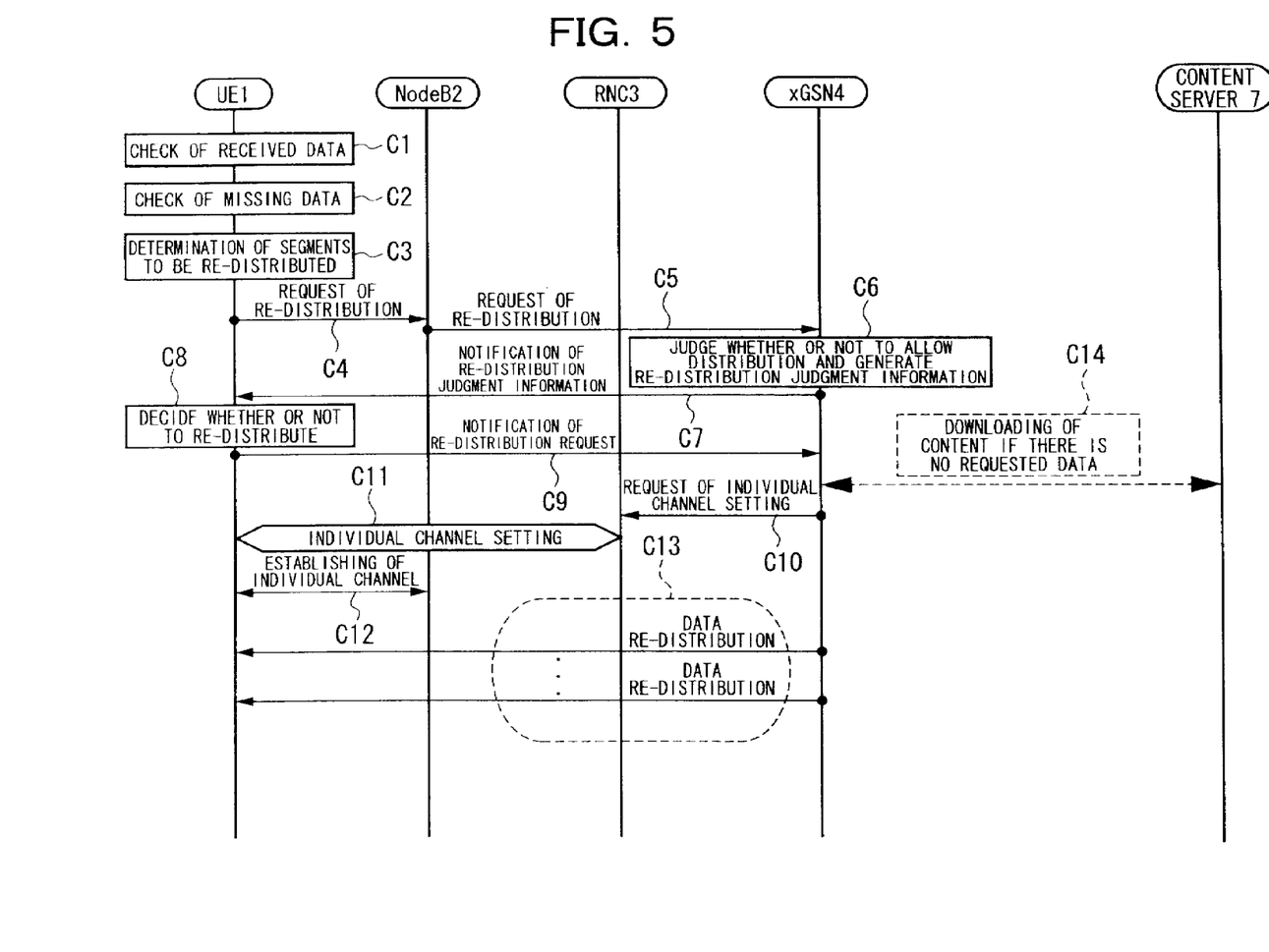
FIG. 5 is a sequence chart showing another example of content re-distribution in the content distribution system of FIG. 1.

FIG. 5 is a sequential chart showing another example of the content distribution operation in the content distribution system of FIG. 1. The following description focuses on the UE 1-1 in presenting the operation that occurs when performing re-distribution. In FIG. 1 and FIG. 5, when the UE 1-1 receives a segment via a multicasting channel from the node B 2-1, the received segment is checked (step C1), and verification is done of missing data, this being a segment for which receiving failed (step C2), based on the information appended to the received segment (content ID, segment group number, and segment number).

In order to give notification to the user, the UE 1-1 displays on a screen the content IDs, segment group numbers, and segment numbers of each of the missing data. By doing this, it is determined what segments the user wishes to have re-distributed (step C3), at which point the UE 1-1 makes a request for re-distribution to the network (steps C4 and C5).

When this is done, in order to request re-distribution of the segments as decided by step C3, the UE 1-1 sends information at the time of distribution request and re-distribution request data information (refer to FIG. 3) via the node B 2-1 and the RNC 3 to the xGSN 4 (steps C4 and C5).

The xGSN 4, in response to the re-distribution request, makes a judgment, based on the information at the time of the distribution request as to whether or not to re-distribute to the UE 1-1 (step C6). The operation of making this judgment as to whether or not to re-distribute at step C6 is the same as the judgment as to whether or not to re-distribute made at step B6 in FIG. 4.

Having decided to perform re-distribution to the UE 1-1, that is, when it is determined that the UE 1-1 is a proper terminal, the xGSN 4, based on the re-distribution request data information, generates re-distribution judgment information for the purpose of judging whether or not to execute re-distribution to the UE 1-1 (step C6). The re-distribution judgment information includes at least one of the time information indicating time required for re-distribution for the UE 1-1 and billing information for the UE 1-1 in the case in which the re-distribution is executed. The xGSN 4 sends the re-distribution judgment information generated at step C6 via the RNC 3 and the node B 2-1 to the UE 1-1 (step C7).

The UE 1-1, in response to the reception of the re-distribution judgment information from the xGSN 4, displays the re-distribution judgment information on a screen. The user, based on the re-distribution judgment information displayed on the screen, decides whether or not re-distribution is required (step C8). The UE 1-1 notifies the xGSN 4, via the node B 2-1 and the RNC 3, of the decision made by the user (step C9). The xGSN 4, in the case in which the notification was that the UE 1-1 is not requested to perform re-distribution, does not perform re-distribution to the UE 1-1.

In the case, however, in which the xGSN 4 recognizes that the UE 1-1 is requesting re-distribution, the xGSN 4 requests the RNC 3 to establish an individual channel to the UE 1-1 (step C10). The RNC 3, in response to the individual channel setting request from the xGSN 4, performs setting processing for an individual channel to the UE 1-1 existing within the cell of the B 2-1 node. By this individual channel setting processing, an individual channel is allocated and established between the node B 2-1 and the UE 1-1 (step C12).

The xGSN 4 performs re-distribution by sequentially reading from the re-distribution buffer 5 the segments (requested segments) to be re-distributed to the UE 1-1, which was recognized as a proper terminal user based on the re-distribution request data information, and sending these segments (step C13). Each of the segments sequentially sent from the xGSN 4 is received at the node B 2-1 via the RNC 3, the node B 2-1 then sending the received segments to the UE 1-1 using the individual channel. In this manner, only segments which the UE 1-1 failed to receive are re-distributed to the UE 1-1.

In the case in which a requested segment is not in the buffer 5, the xGSN 4 downloads the requested segment from the content server 7 (step C14).

Second Embodiment

Figure 6:
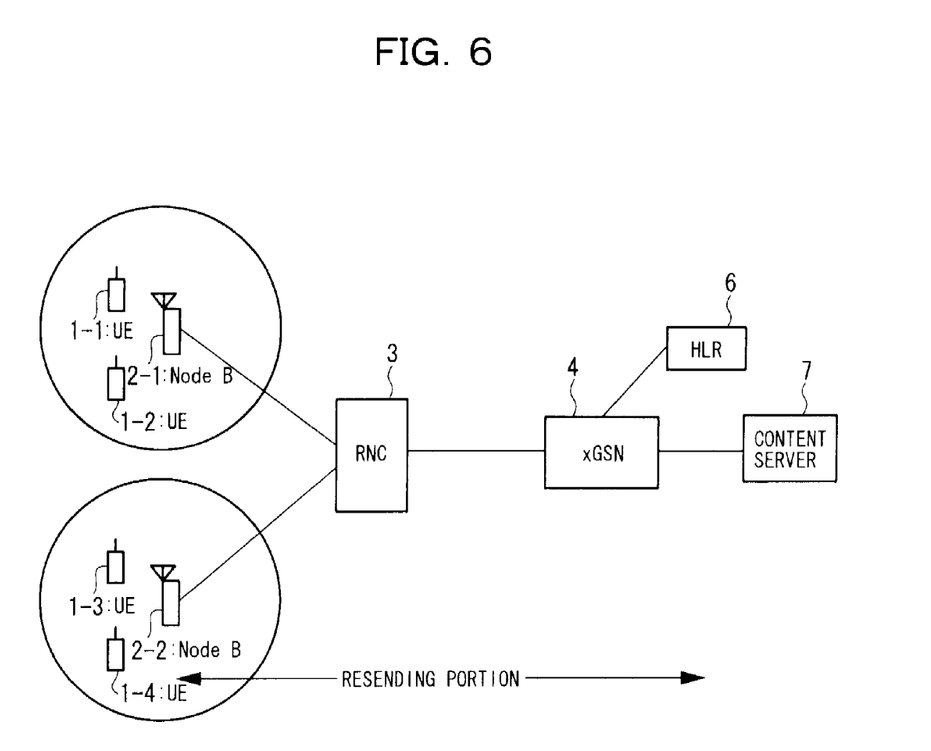
FIG. 6 is a drawing sowing the configuration of a content distribution system according to a second embodiment of the present invention.

A content distribution system according to a second embodiment of the present invention is described below, with reference to the relevant accompanying drawings. FIG. 6 is a drawing showing the second embodiment, in which elements that are the same as in FIG. 1 are assigned the same reference numerals as in FIG. 1. The content distribution system according to the second embodiment as shown in FIG. 6 differs from the first embodiment shown in FIG. 1 in that the xGSN 4 does not have a re-distribution buffer 5.

Because the content re-distribution operation of the content distribution system of FIG. 6 is the same as shown in FIG. 2, it will not be described herein.

Figure 7:
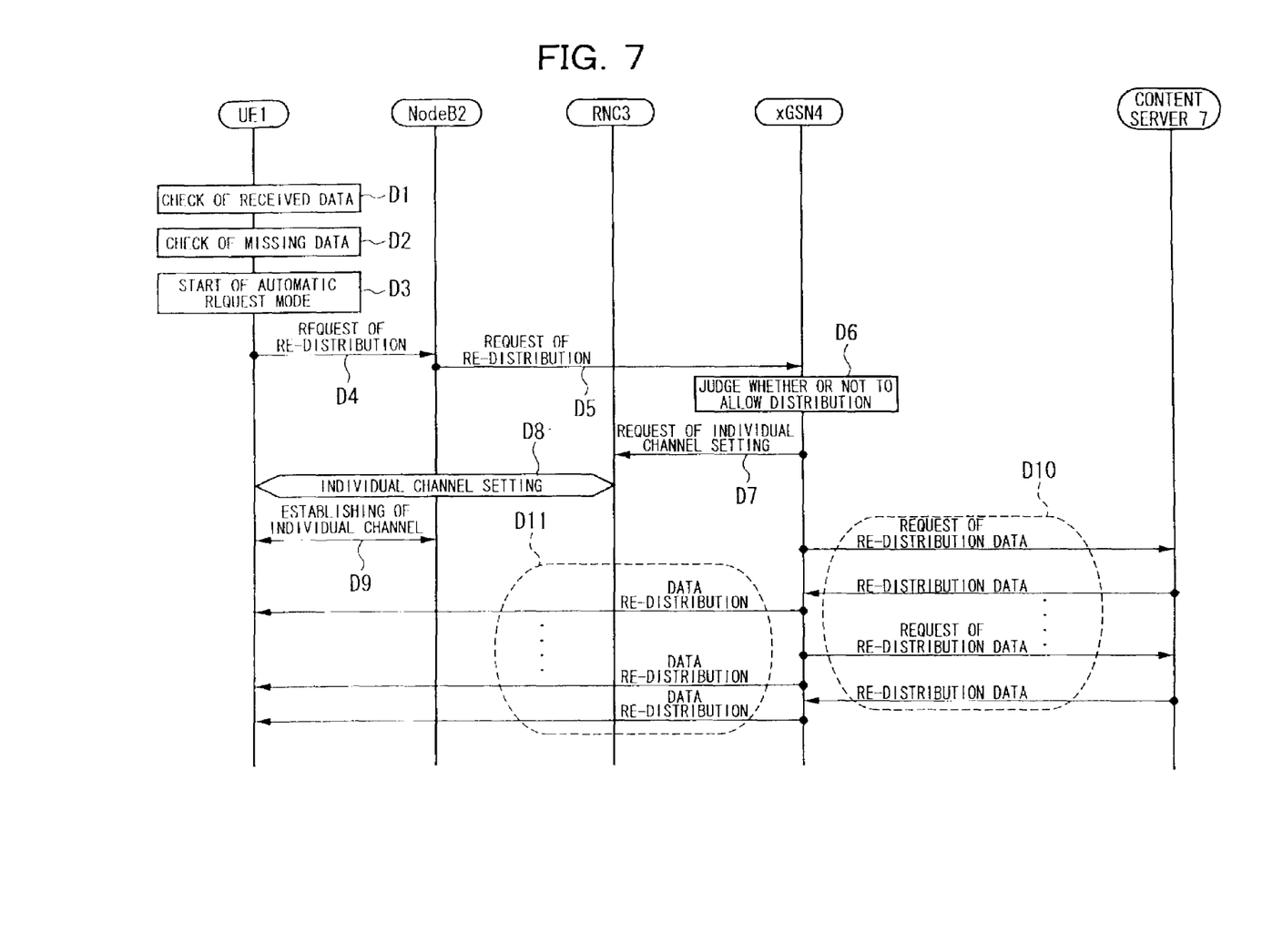
FIG. 7 is a sequence chart showing an example of content re-distribution in the content distribution system of FIG. 6.

FIG. 7 is a sequential chart showing an example of content re-distribution in the content distribution system of FIG. 6. The following description focuses on the UE 1-1 in presenting the operation that occurs when performing re-distribution. Because the processing at steps D1 to D9 of FIG. 7 is the same as steps B1 to B9 of FIG. 4, it will not be described herein.

In FIG. 6 and FIG. 7, when the properness of the UE 1-1 is recognized at step D6, the result is that at step D9 an individual channel is established between the UE 1-1 and the node B 2-1. When this is done, the xGSN 4 requests to the content server 7 to re-distribute the segments which are requested by the UE 1-1, which is recognized as a proper user terminal based on the re-distribution request data information from UE 1-1 (refer to FIG. 3). In response to the request from the xGSN 4, the content server 7 sends to the xGSN 4 each of the segments to be re-distributed (step D10). One "request for data for re-distribution" output from the xGSN 4 at step D10 requests only one re-distributed data to the content server 7, and in response to the "request for data for re-distribution", the content server 7 send one re-distribution data to the xGSN 4. That is, as many "re-distribution data requests" are sent as there are re-distribution data.

When the xGSN 4 receives each of the re-distribution data sent from the content server 7, the xGSN 4 performs re-distribution by sending each of the received re-distribution data (step D11). Each of the segments sent from the xGSN 4 is received at the node B 2-1 via the RNC 3, and the node B 2-1 sends the received segments to the UE 1-1 using the individual channel. In this manner, only those segments that the UE 1-1 failed to receive are sent to the UE 1-1.

At step D10, when the xGSN 4 receives one re-distribution data from the content server 7, it makes a request to the content server 7 for the next re-distribution data. It is alternatively possible for the xGSN 4 to request the next re-distribution data to the content server 7 at steps D10 and D11, when the xGSN 4 sends to the UE 1-1 one re-distribution data received from the content server 7.

Figure 8:
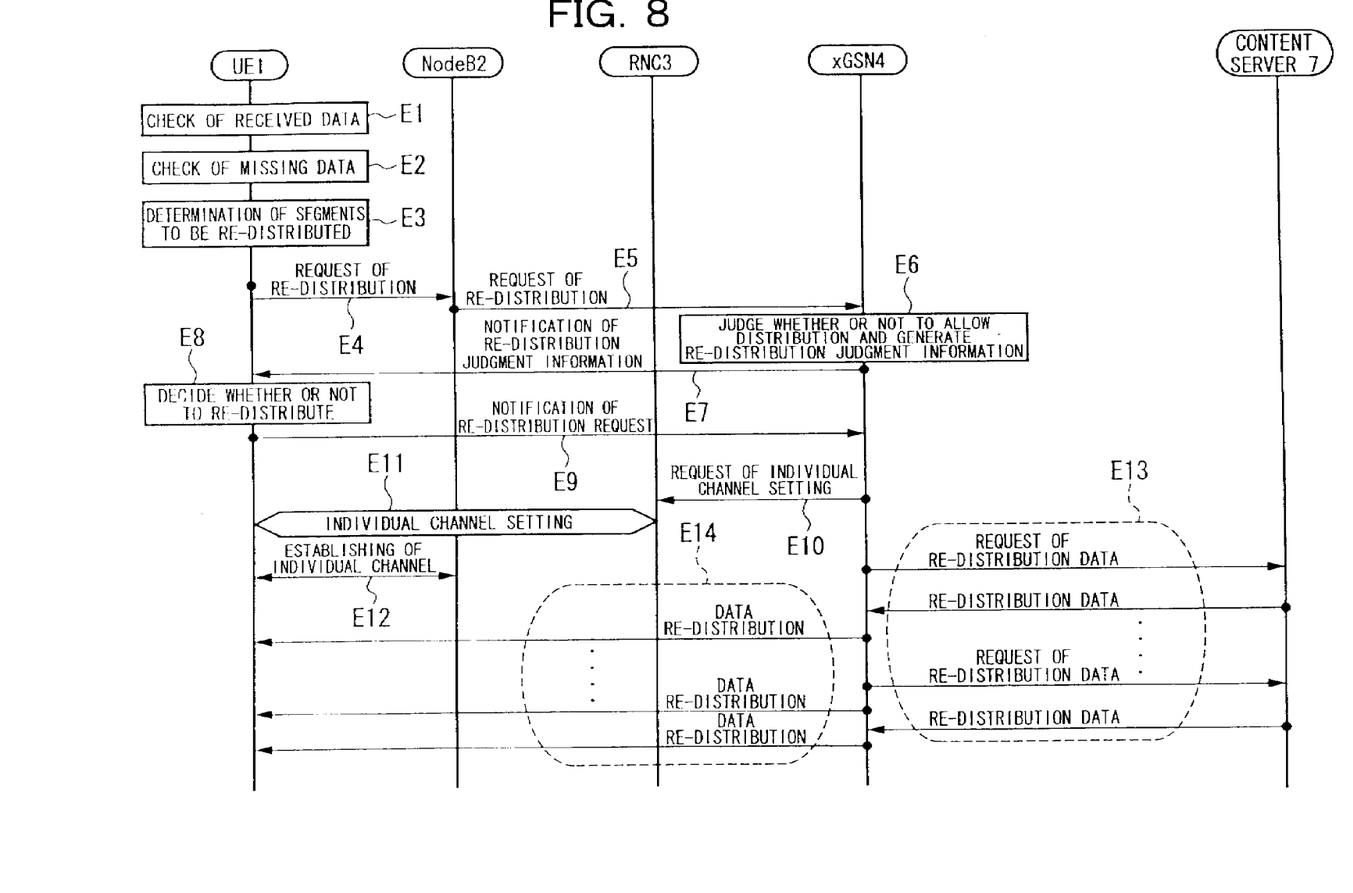
FIG. 8 is a sequence chart showing another example of content re-distribution in the content distribution system of FIG. 6.

FIG. 8 is a sequential chart showing another example of content distribution operation in the content distribution system shown in FIG. 6. The following description focuses on the UE 1-1 in presenting the operation that occurs when performing re-distribution. Because the steps E1 to E12 in FIG. 8 are the same as the steps C1 to C12 in FIG. 5, they are not described herein.

In FIG. 6 and FIG. 8, the xGSN 4 verifies the properness of the UE 1-1 at step E6, and at step E9 detects that the UE 1-1 makes a request for re-distribution. As a result of this request, when an individual channel between the UE 1-1 and the node B 2-1 is established at step E12, the xGSN 4 makes a request to the content server 7 for the re-distribution segments, which are the segments requested by the UE 1-1, which is recognized as a proper user terminal based on the re-distribution request data information from the UE 1-1 (refer to FIG. 3). In response to the request from the xGSN 4, the content server 7 sends the re-distribution segments to the xGSN 4 (step E13). One "request for data for re-distribution" output from the xGSN 4 at step E13 requests only one re-distributed data to the content server 7, and in response to the "request for data for re-distribution", the content server 7 send one re-distribution data to the xGSN 4. That is, as many "re-distribution data requests" are sent as there are re-distribution data.

Upon receiving the re-distribution data sent from the content server 7 at step E13, the xGSN 4 performs re-distribution by sending the received re-distribution data (step E14). Each of the segments sent by the xGSN 4 is received at the node B 2-1 via the RNC 3, whereupon the node B 2-1 sends the received segments to the UE 1-1, using the individual channel. In this manner, only those segments that the UE 1-1 failed to receive are sent to the UE 1-1.

Furthermore, at step E13 when one re-distribution data is received from the content server 7 by the xGSN 4, the xGSN 4 requests the next re-distribution data to the content server 7. At steps E13 and E14, it is alternatively possible for the xGSN 4 to request to the content server 7 the next re-distribution data when one re-distribution data received from the content server 7 is sent to the UE 1-1.

In this manner, in a content distribution system according to embodiments of the present invention, because the re-distribution of content that is multicasted using a multicasting channel is re-distributed to an UE 1-1 using an individual channel, it is possible to achieve content distribution with high reliability and good efficiency in utilizing wireless resources. Additionally, because re-distribution is done to a UE only when the UE making the re-distribution request is verified as being a proper UE, based on the re-distribution request data information, it is possible to protect the content, which is an asset of the provider processing this system.

It will be understood that the RNC 3 processing operations at step A11 of FIG. 2, step B8 of FIG. 4, step C11 of FIG. 5, step D8 of FIG. 7, and step E11 of FIG. 8 can alternatively be implemented by reading a program, which is stored in a storage medium such as a ROM or the like, and executed by a CPU (controller).

The present invention, as described in detail above, provides content distribution with high reliability and achieves effective utilization of wireless resources. The reason is that content sent via a multicasting channel from a network to a plurality of mobile communication terminal is re-distributed to terminals that failed in receiving the content, using an individual channel.

What is claimed is:

1. A mobile communication terminal for receiving a content from a content distribution system which multicasts the same content to a plurality of mobile communication terminals,
    wherein said mobile communication terminal is configured to judge a quality of each segment of the received content; and
    wherein said mobile communication terminal having distribution requesting means for requesting re-distribution of segments for which reception failed in receiving said multicasted content to said content distribution system, in a case in which said mobile communication terminal detects reception of a segment has failed based on the judged quality,
    wherein said distribution requesting means including two modes, one mode of which is first requesting mode for automatically requesting re-distribution of segments for which reception failed to said content distribution system and the other mode of which is second requesting mode in which the user of said mobile communication terminal determines whether or not to request re-distribution of segments for which reception failed to said content distribution system.

2. A mobile communication terminal according to claim 1, wherein after requesting re-distribution of said segment, said mobile communication terminal sends authentication information required to verify a properness of said mobile communication terminal to said content distribution system, in response to an authentication request from said content distribution system.

3. A mobile communication terminal according to claim 2, wherein said authentication information includes position information in which said mobile communication terminal existed when said mobile communication terminal requested said re-distribution to said content distribution system.

4. A mobile communication terminal according to claim 1, wherein said content has a plurality of segments, each segment has sequence information indicating the continuity thereof, said mobile communication terminal detects segments for which reception failed based on said sequence information received from said content distribution system.

5. A mobile communication terminal according to claim 1, wherein said re-distributing requesting means of said mobile communication terminal, when requesting said re-distribution to said content distribution system, sends to said content distribution system information indicating a cell in which said mobile communication terminal existed at the time of verification of properness to verify properness of said mobile communication terminal.

6. A mobile communication terminal according to claim 1, wherein said re-distribution means in said first requesting mode thereof requests re-distribution of segments for which reception failed, based on the number of segments for which failed reception was detected within a prescribed period of time.

7. A mobile communication terminal for receiving a content via a multicasting channel from a content distribution system which multicasts the same content to a plurality of mobile communication terminals, wherein said mobile communication terminal is configured to judge a quality of each segment of the received content,
    wherein said mobile communication terminal having distribution requesting means for requesting re-distribution of segments for which reception failed in receiving said mulitcasted content to said content distribution system, in a case in which said mobile communication terminal detects reception of a segment has failed based on the judge quality,
    wherein said distribution requesting means including two modes, one mode of which is first requesting mode for automatically requesting re-distribution of segments for which reception failed to said content distribution system and the other mode of which is second requesting mode in which the user of said mobile communication terminal determines whether or not to request re-distribution of segments for which reception failed to said content distribution system,
    wherein the mobile communication terminal is configured to receive re-distributed segments via an individual channel separate from said multicasting channel, allocated between said content distribution system and said mobile communication terminal for a re-distributed content, in a case in which said mobile communication terminal judges reception of a segment has failed based on the judged quality.

8. A mobile communication terminal according to claim 7, wherein a data transmission rate of said individual channel is greater than that of said multicasting channel.

9. A mobile communication terminal according to claim 7, wherein said multicasted content and said re-distributed content is simultaneously received by said mobile communication terminal.

* * * * *